(12) United States Patent
Tsai et al.

(10) Patent No.: US 7,974,029 B2
(45) Date of Patent: Jul. 5, 2011

(54) DISK DRIVE BIASING REFRESH ZONE COUNTERS BASED ON WRITE COMMANDS

(75) Inventors: Chun Sei Tsai, Tustin, CA (US); Sang Huynh, Corona, CA (US); Anthony L. Pei, Irvine, CA (US); Don Brunnett, Pleasanton, CA (US); Jahangir John Kasraee, Irvine, CA (US); Kent W. Gibbons, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 4 days.

(21) Appl. No.: 12/533,950

(22) Filed: Jul. 31, 2009

(65) Prior Publication Data

US 2011/0026159 A1 Feb. 3, 2011

(51) Int. Cl.
*G11B 27/36* (2006.01)

(52) U.S. Cl. .................. 360/31; 360/48; 360/53; 360/62

(58) Field of Classification Search .................. None
See application file for complete search history.

(56) References Cited

U.S. PATENT DOCUMENTS

| | | | |
|---|---|---|---|
| 4,642,715 A | 2/1987 | Ende | |
| 4,750,059 A * | 6/1988 | Syracuse | 360/48 |
| 4,949,036 A | 8/1990 | Bezinque et al. | |
| 5,487,077 A | 1/1996 | Hassner et al. | |
| 5,508,869 A | 4/1996 | Nanjyo | |
| 5,600,500 A | 2/1997 | Madsen et al. | |
| 5,651,131 A | 7/1997 | Chesley | |
| 5,682,273 A | 10/1997 | Hetzler | |
| 5,781,518 A * | 7/1998 | Yamagami et al. | 369/47.25 |
| 5,784,296 A | 7/1998 | Baker et al. | |
| 5,870,237 A * | 2/1999 | Emo et al. | 360/48 |
| 5,872,800 A | 2/1999 | Glover et al. | |
| 5,873,114 A | 2/1999 | Rahman et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 5,970,507 A | 10/1999 | Kato et al. | |
| 6,052,804 A | 4/2000 | Thowe et al. | |
| 6,181,500 B1 | 1/2001 | Serrano et al. | |
| 6,266,199 B1 | 7/2001 | Gillis et al. | |
| 6,289,484 B1 | 9/2001 | Rothberg et al. | |

(Continued)

FOREIGN PATENT DOCUMENTS

JP  10-255202  9/1998

OTHER PUBLICATIONS

U.S. Appl. No. 11/769,447 to Tsai, et al., filed Jun. 27, 2007, 30 pages.

*Primary Examiner* — Dismery E Mercedes

(57) ABSTRACT

A disk drive is disclosed comprising a disk comprising a plurality of tracks, and a head actuated over the disk. A plurality of refresh zones are defined, wherein each refresh zone corresponds to a plurality of the tracks. Data is written to a first refresh zone, and a first zone counter is updated for a second refresh zone at a first rate. Data is written to a third refresh zone, and the first zone counter is updated for the second refresh zone at a second rate different than the first rate.

24 Claims, 6 Drawing Sheets

U.S. PATENT DOCUMENTS

| | | | |
|---|---|---|---|
| 6,317,813 B1 | 11/2001 | Su et al. | |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |
| 6,393,511 B1 | 5/2002 | Albrecht et al. | |
| 6,426,909 B1 | 7/2002 | Tomita | |
| 6,429,984 B1 * | 8/2002 | Alex | 360/31 |
| 6,442,715 B1 | 8/2002 | Wilson | |
| 6,445,525 B1 * | 9/2002 | Young | 360/51 |
| 6,490,111 B1 | 12/2002 | Sacks | |
| 6,570,801 B2 | 5/2003 | Yoshida et al. | |
| 6,603,617 B1 | 8/2003 | Cross | |
| 6,606,211 B1 * | 8/2003 | Lim et al. | 360/53 |
| 6,628,466 B2 | 9/2003 | Alex | |
| 6,650,492 B2 | 11/2003 | Lenny et al. | |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,697,992 B2 | 2/2004 | Ito et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |
| 6,854,022 B1 | 2/2005 | Thelin | |
| 6,854,071 B2 | 2/2005 | King et al. | |
| 6,862,505 B2 | 3/2005 | Satoh et al. | |
| 6,892,249 B1 | 5/2005 | Codilian et al. | |
| 6,895,500 B1 | 5/2005 | Rothberg | |
| 6,898,033 B2 | 5/2005 | Weinstein et al. | |
| 6,947,234 B2 | 9/2005 | Lamberts et al. | |
| 6,948,102 B2 | 9/2005 | Smith | |
| 6,950,967 B1 | 9/2005 | Brunnett et al. | |
| 6,980,386 B2 | 12/2005 | Wach et al. | |
| 6,982,842 B2 | 1/2006 | Jing et al. | |
| 6,987,630 B1 | 1/2006 | Higgins et al. | |
| 6,995,933 B1 | 2/2006 | Codilian et al. | |
| 7,006,321 B2 | 2/2006 | Kisaka | |
| 7,023,645 B1 | 4/2006 | Emo et al. | |
| 7,024,614 B1 * | 4/2006 | Thelin et al. | 714/770 |
| 7,032,127 B1 | 4/2006 | Egan et al. | |
| 7,043,598 B2 | 5/2006 | Wu et al. | |
| 7,050,252 B1 | 5/2006 | Vallis | |
| 7,076,604 B1 | 7/2006 | Thelin | |
| 7,082,494 B1 | 7/2006 | Thelin et al. | |
| 7,102,838 B2 * | 9/2006 | Kim et al. | 360/31 |
| 7,120,737 B1 * | 10/2006 | Thelin | 711/112 |
| 7,143,203 B1 | 11/2006 | Altmejd | |
| 7,143,309 B2 | 11/2006 | Yoshida | |
| 7,173,782 B2 * | 2/2007 | Ikeda et al. | 360/31 |
| 7,177,979 B2 * | 2/2007 | Kuwamura | 711/112 |
| 7,227,708 B2 | 6/2007 | Feng | |
| 7,345,837 B1 * | 3/2008 | Schreck et al. | 360/31 |
| 7,362,532 B2 | 4/2008 | Iwama | |
| 7,405,893 B2 * | 7/2008 | Bi et al. | 360/48 |
| 7,477,465 B2 | 1/2009 | Yu | |
| 7,599,139 B1 * | 10/2009 | Bombet et al. | 360/31 |
| 7,606,129 B2 | 10/2009 | Urata et al. | |
| 7,649,704 B1 * | 1/2010 | Bombet et al. | 360/31 |
| 7,672,072 B1 * | 3/2010 | Boyle et al. | 360/31 |
| 7,872,822 B1 * | 1/2011 | Rothberg | 360/31 |
| 2001/0043424 A1 | 11/2001 | Nguyen | |
| 2003/0007269 A1 | 1/2003 | Alex | |
| 2003/0016461 A1 | 1/2003 | Seng et al. | |
| 2004/0153949 A1 | 8/2004 | Ro et al. | |
| 2004/0174627 A1 | 9/2004 | Kim et al. | |
| 2004/0252397 A1 | 12/2004 | Hodge et al. | |
| 2004/0264028 A1 | 12/2004 | Ishii et al. | |
| 2004/0268033 A1 | 12/2004 | Chia et al. | |
| 2005/0036437 A1 | 2/2005 | Learned et al. | |
| 2005/0063084 A1 | 3/2005 | Fujiwara et al. | |
| 2005/0078393 A1 | 4/2005 | Cho | |
| 2005/0146803 A1 | 7/2005 | Kim et al. | |
| 2005/0180267 A1 | 8/2005 | Jeong et al. | |
| 2005/0188153 A1 | 8/2005 | Yun et al. | |
| 2005/0207049 A1 | 9/2005 | Ikeda et al. | |
| 2006/0066971 A1 | 3/2006 | Alex et al. | |
| 2006/0098318 A1 | 5/2006 | Feng | |
| 2006/0101197 A1 | 5/2006 | Georgis et al. | |
| 2006/0132954 A1 | 6/2006 | Wada et al. | |
| 2006/0198041 A1 | 9/2006 | Kuwamura | |
| 2007/0076315 A1 | 4/2007 | McMurtrey | |
| 2007/0277011 A1 | 11/2007 | Tanaka et al. | |

* cited by examiner $$ZC_n = ZC_n + F_n(UM)$$

$$F_n(UM) = WCT \times DLG_n \times f(Temp)$$

$$WCT = C1[LBA] + C2[WB] + C3[Freq] + C4[ST]$$

$$DLG_n = C5[ADJ_0] + C6[ADJ_{\pm 1}] + C7[ADJ_{\pm 2}] + C8[ADJ_{\pm 3}]$$

FIG. 6A

←ID   TARGET↓   OD→

|  |  |  | C8 | C7 | C6 | C5 | C6 | C7 | C8 |  |  |  |  |
|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 1 | 1 | 0 | 0 | 0 | 0 |
| 0 | 0 | 0 | 1 | 1 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 6B

| ZONEn | DLGn | C5 | C6 | C7 | C8 |
|---|---|---|---|---|---|
| 1 | 1 | 0 | 0 | 0 | 0 |
| 2 | 2 | 0 | 0 | 0 | 0 |
| 3 | 3 | 0 | 0 | 0 | 0 |
| 4 | 4 | 0 | 0 | 0 | 1 |
| 5 | 5 | 0 | 0 | 0 | 1 |
| 6 | 6 | 0 | 0 | 1 | 0 |
| 7 | 7 | 0 | 1 | 0 | 0 |
| 8 (TARGET) | 8 | 1 | 0 | 0 | 0 |
| 9 | 9 | 0 | 1 | 0 | 0 |
| 10 | 10 | 0 | 0 | 1 | 0 |
| 11 | 11 | 0 | 0 | 1 | 0 |
| 12 | 12 | 0 | 0 | 0 | 1 |
| 13 | 13 | 0 | 0 | 0 | 0 |
| 14 | 14 | 0 | 0 | 0 | 0 |
| 15 | 15 | 0 | 0 | 0 | 0 |

Zones 4–12: AFFECTED ZONES

FIG. 6C de# DISK DRIVE BIASING REFRESH ZONE COUNTERS BASED ON WRITE COMMANDS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 6A shows equations for updating a zone counter according to an embodiment of the present invention.

FIGS. 6B and 6C show tables for updating zone counters according to an embodiment of the present invention.

DETAILED DESCRIPTION OF EMBODIMENTS OF THE INVENTION

Figure 1:
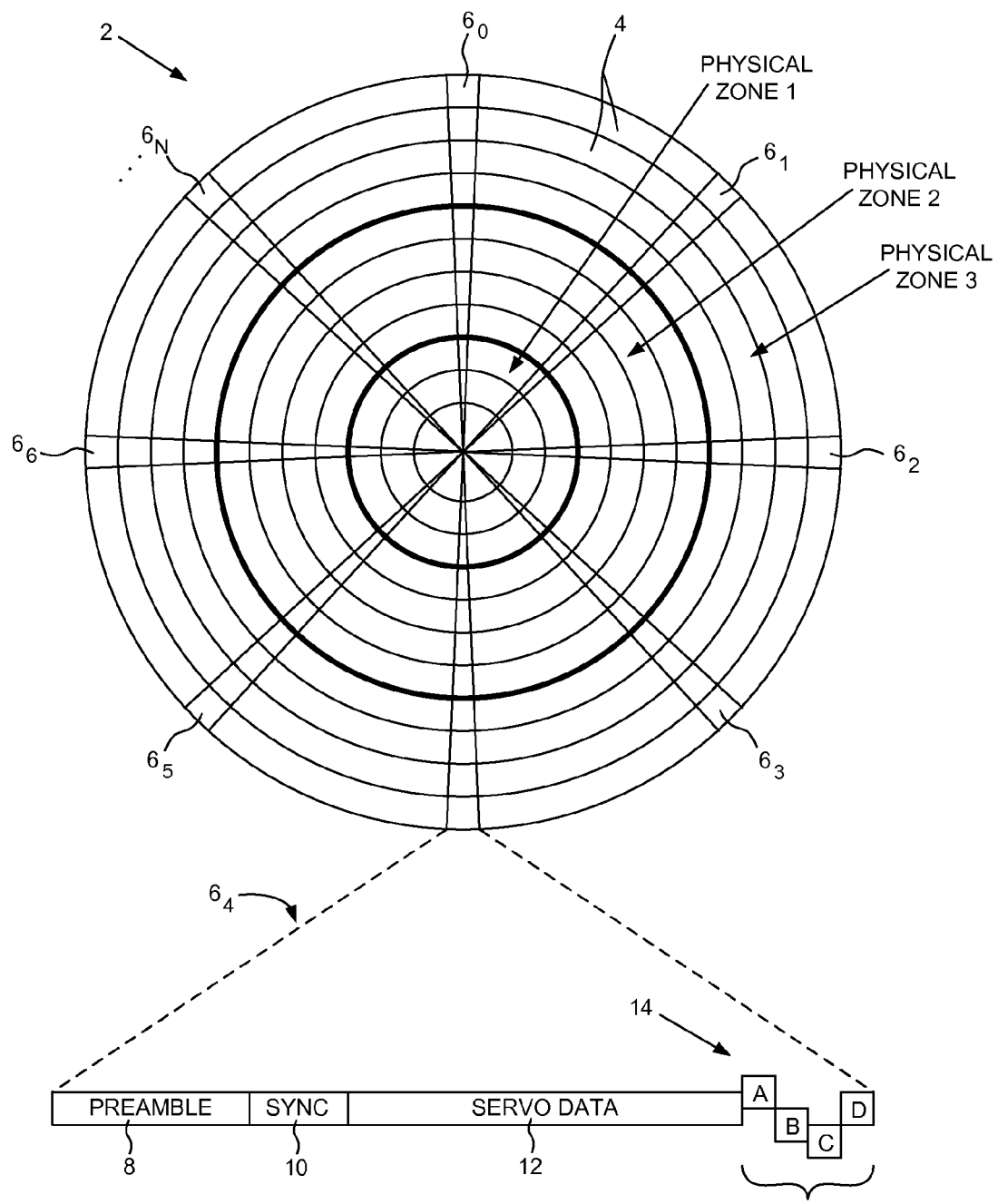
FIG. 1 shows a prior art disk format comprising a plurality of tracks defined by embedded servo sectors.
Figure 2B:
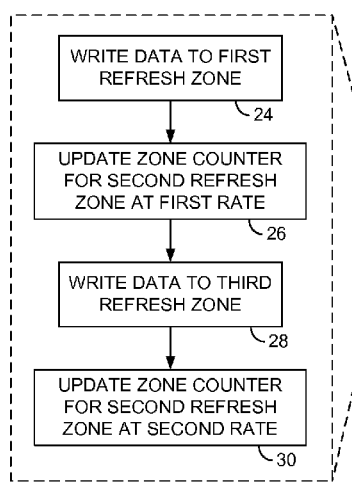
FIG. 2B is a flow diagram executed by the control circuitry according to an embodiment of the present invention wherein a zone counter is updated at a different rate depending on the location (refresh zone) of written data.
Figure 2A:
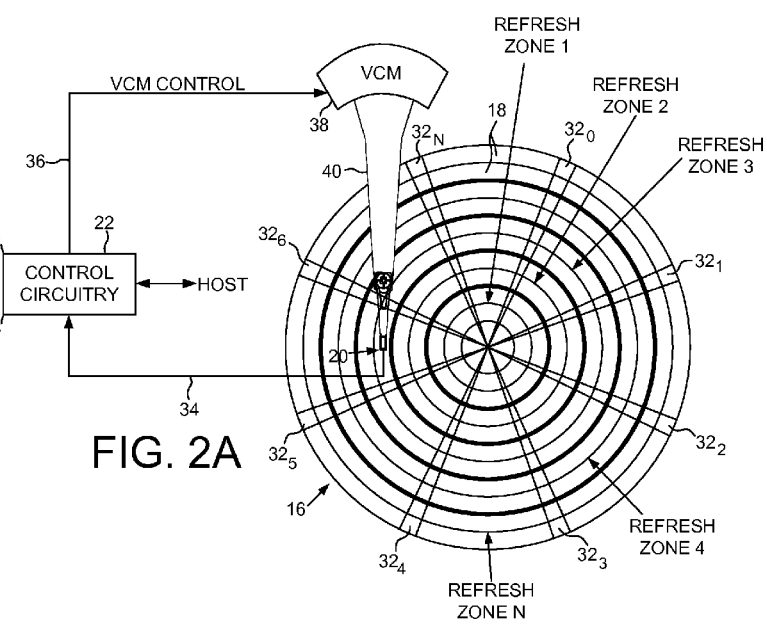
FIG. 2A shows a disk drive according to an embodiment of the present invention comprising a head actuated over a disk, and control circuitry.

FIG. 2A shows a disk drive according to an embodiment of the present invention comprising a disk 16 having a plurality of tracks 18, and a head 20 actuated over the disk 16. A plurality of refresh zones are defined, wherein each refresh zone corresponds to a plurality of the tracks 18. The disk drive further comprises control circuitry 22 operable to execute the flow diagram of FIG. 2B, wherein data is written to a first refresh zone (step 24), and a first zone counter is updated for a second refresh zone at a first rate (step 26). Data is written to a third refresh zone (step 28), and the first zone counter is updated for the second refresh zone at a second rate different than the first rate (step 30).

The zone counters are used to refresh the data stored in the tracks of the corresponding refresh zone. For example, when a zone counter exceeds a threshold, the corresponding refresh zone is refreshed by reading and rewriting the data stored in the tracks. In one embodiment, the data of a refresh zone may be read and rewritten regardless as to degradation of the data. In another embodiment, the data in a refresh zoned may be scanned first to determine whether a rewrite is necessary. For example, the data may be rewritten only if a number of detected error correction code (ECC) errors exceeds a threshold.

The refresh operation may be executed in any suitable manner and at any suitable time. In one embodiment, a refresh operation may be performed on a refresh zone immediately after its zone counter exceeds a threshold. In another embodiment, the refresh zone may be scheduled for refresh after its zone counter exceeds a threshold, and the refresh operation executed during an idle mode of the disk drive (when the disk drive is not processing access commands received from a host). In yet another embodiment, the zone counters may be used to prioritize the refresh operations such that refresh zones having higher zone counters are refreshed sooner relative to the other refresh zones.

In the embodiments of the present invention, each zone counter may be updated at different rates depending on one or more factors. In the embodiment of FIG. 2B, the update rate of a first zone counter varies based on a write operation to another refresh zone due to the varying affect of adjacent track interference. For example in embodiments described below, the update rate may depend on whether an updated refresh zone is adjacent or non-adjacent to a written refresh zone, or whether an updated refresh zone is toward an inner diameter or outer diameter of the disk away from a written refresh zone.

In the embodiment of FIG. 2A, the disk 16 comprises a plurality of embedded servo sectors $32_0$-$32_N$ which define the plurality of tracks 18. Each servo sector $32_i$ comprises head positioning information such as a track address for coarse positioning during seeks, and servo bursts for fine positioning while tracking the centerline of a target track during write/read operations. The control circuitry 22 processes a read signal 34 emanating from the head 20 to demodulate the servo sectors into a position error signal (PES). The PES is filtered with a suitable compensation filter to generate a control signal 36 applied to a VCM 38 which rotates an actuator arm 40 about a pivot in a direction that reduces the PES.

Figure 3A:
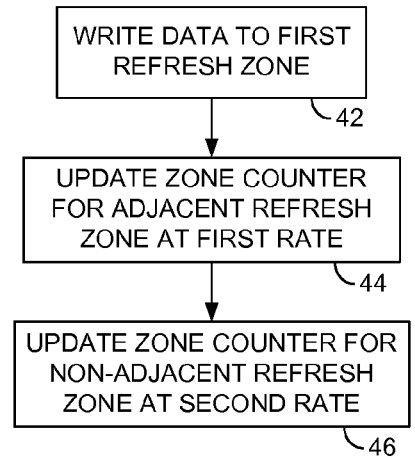
FIG. 3A shows a flow diagram according to an embodiment of the present invention wherein a zone counter is updated at a different rate depending on whether a written zone is adjacent or non-adjacent.

FIG. 3A shows a flow diagram according to an embodiment of the present invention wherein after writing data to a first refresh zone (step 42), the zone counter for an adjacent refresh zone is updated at a first rate (step 44), and the zone counter for a non-adjacent refresh zone is updated at a second rate (step 46). This embodiment is illustrated in FIG. 3C wherein the outer diameter refresh zone adjacent to a target (written) refresh zone is incremented by three, whereas the non-adjacent refresh zones are incremented by two and one. In this embodiment, the affect of adjacent track interference on the proximate refresh zones dissipates as the distance increases away from the target refresh zone.

Figure 3B:
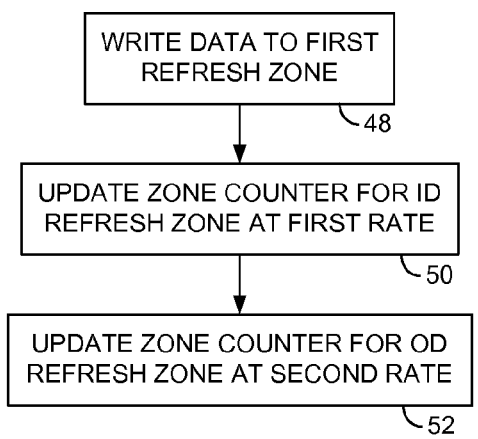
FIG. 3B shows a flow diagram according to an embodiment of the present invention wherein after writing data to a first refresh zone, a zone counter of a second refresh zone toward the inner diameter of the disk is updated at a first rate, and a zone counter of a third refresh zone toward the outer diameter of the disk is updated at a second rate.
Figure 3C:
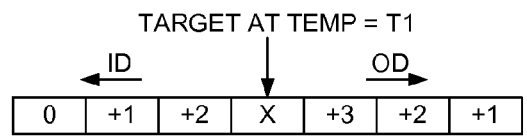
FIG. 3C illustrates an embodiment of the present invention wherein zone counters of non-adjacent zones are updated at a slower rate, and at a varying rate depending on whether the refresh zone is toward an inner diameter or outer diameter of the disk.

FIG. 3B shows a flow diagram according to an embodiment of the present invention wherein after writing data to a first refresh zone (step 48), the zone counter for a refresh zone toward the inner diameter (ID) away from the target refresh zone is updated at a first rate (step 50), and the zone counter for a refresh zone toward the outer diameter (OD) away from the target refresh zone is updated at a second rate (step 52). This embodiment is illustrated in FIG. 3C wherein the zone counter for the adjacent OD refresh zone is incremented by three, and the zone counter for the adjacent ID refresh zone is incremented by two. In this embodiment, the effect of adjacent track interference on the OD and ID refresh zones varies due, for example, to the geometry and/or skew angle of the head.

Figure 3D:
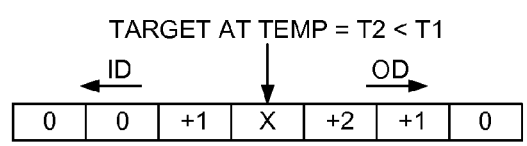
FIG. 3D illustrates an embodiment of the present invention wherein the zone counter update rate of adjacent and non-adjacent zones varies based on the ambient temperature of the disk drive.

FIG. 3D illustrates an embodiment of the present invention wherein the update rate of the proximate refresh zones varies based on the ambient temperature of the disk drive. In the example of FIG. 3D, the temperature is lower during the write operation as compared to FIG. 3C, and therefore in this embodiment the range of affected refresh zones decreases, as well as the update rate of the proximate refresh zones. In other embodiments, only the update rate of the proximate refresh zones may change while the range of affected refresh zones remains the same.

Figure 4A:
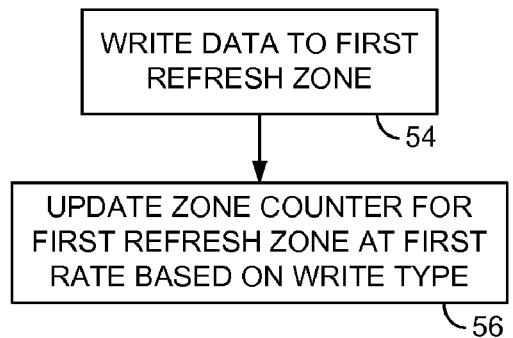
FIG. 4A is a flow diagram according to an embodiment of the present invention wherein a zone counter is updated at a rate based on a write type.

FIG. 4A is a flow diagram according to an embodiment of the present invention wherein after writing data to a first refresh zone (step 54), the corresponding zone counter is updated at a rate based on the write type (step 56). There are a number of different write types that may affect magnetic entropy with varying degree, and there are write types where the effect of magnetic entropy is less of a concern. In the latter case, the zone counter may be updated less frequently to avoid the performance degradation associated with refreshing data.

Figure 4B:
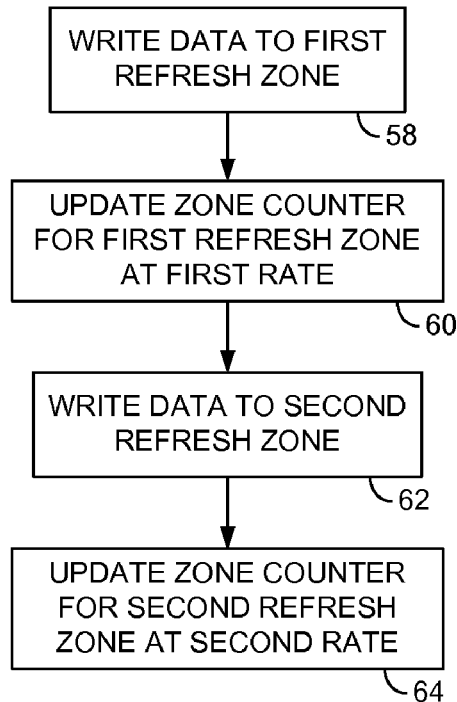
FIG. 4B is a flow diagram according to an embodiment of the present invention wherein the zone counters are updated at different rates based on their radial locations.
Figure 4C:
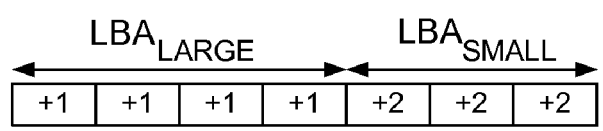
FIG. 4C illustrates an embodiment of the present invention wherein the zone counters of the refresh zones are updated at different rates depending on the logical block address (LBA) of write commands.

FIG. 4B shows a flow diagram according to an embodiment of the present invention wherein after writing data to a first refresh zone (step 58), the corresponding zone counter is updated at a first rate (step 60), and after writing data to a second refresh zone (step 62), the corresponding zone counter is updated at a second rate (step 64). An example of this embodiment is illustrated in FIG. 4C wherein small logical block addresses (LBAs) may be associated with more critical data written to the corresponding refresh zones, such as operating system data, whereas larger LBAs may be associated with less critical data. In order to help prevent the loss of the critical data, the refresh zones corresponding to the smaller LBAs are refreshed more frequently by updating the zone counters at a higher rate.

Figure 5A:
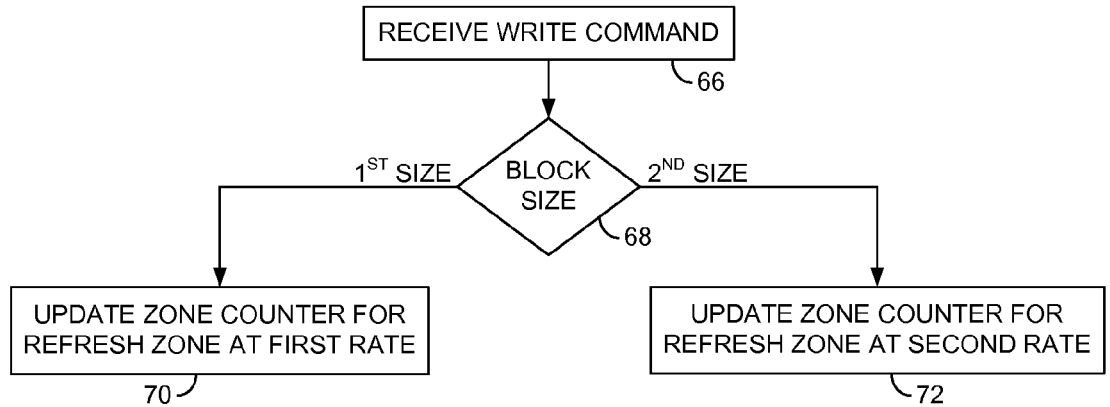
FIG. 5A shows a flow diagram according to an embodiment of the present invention wherein the zone counters are updated at different rates based on the block size of write commands.

FIG. 5A is a flow diagram according to another embodiment of the present invention wherein when a write command is received (step 66), the block size of the write command is evaluated (step 68). Write commands having a first block size update the corresponding zone counter(s) at a first rate (step 70), and write commands having a second block size update the corresponding zone counter(s) at a second rate (step 72). For example, write commands having a large block size may overwrite a substantial part of a refresh zone, and therefore the refresh operation for that zone may be deferred since overwriting data is similar to a refresh operation. In another example, a small block size write may indicate the data is more critical (e.g., operating system data) whereas a large block size write may indicate the data is less critical (e.g., streaming video data). Accordingly, write commands having a small block size may update the corresponding zone counter(s) more frequently to help ensure the integrity of the more critical data.

Figure 5B:
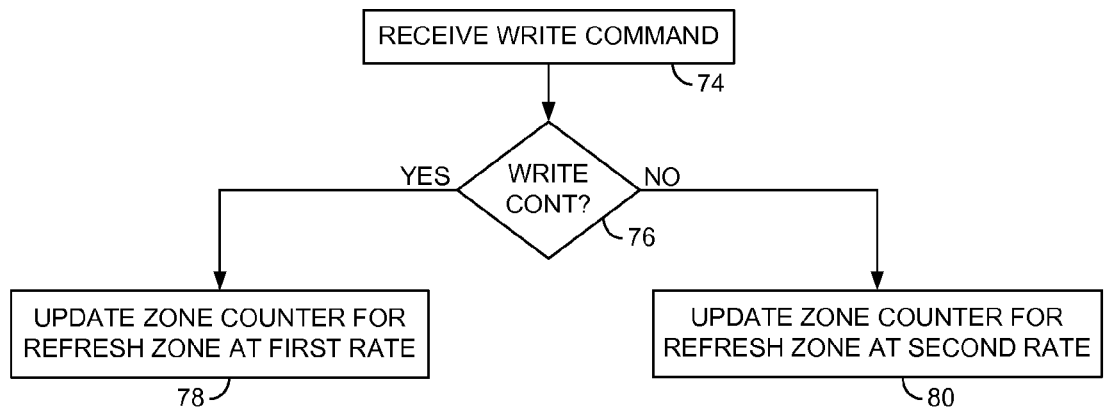
FIG. 5B shows a flow diagram according to an embodiment of the present invention wherein the zone counters are updated at different rates based on whether the write command is a write continuous command.

FIG. 5B shows a flow diagram according to an embodiment of the present invention wherein when a write command is received (step 74), and the write command is a "write continuous" command (step 76), the corresponding zone counter is updated at a first rate (step 78), otherwise the corresponding zone counter is updated at a second rate (step 80). A write continuous command means the write command will be completed even when a write error is encountered, indicating the corresponding write data is probably less critical (e.g., streaming video data).

Figure 5C:
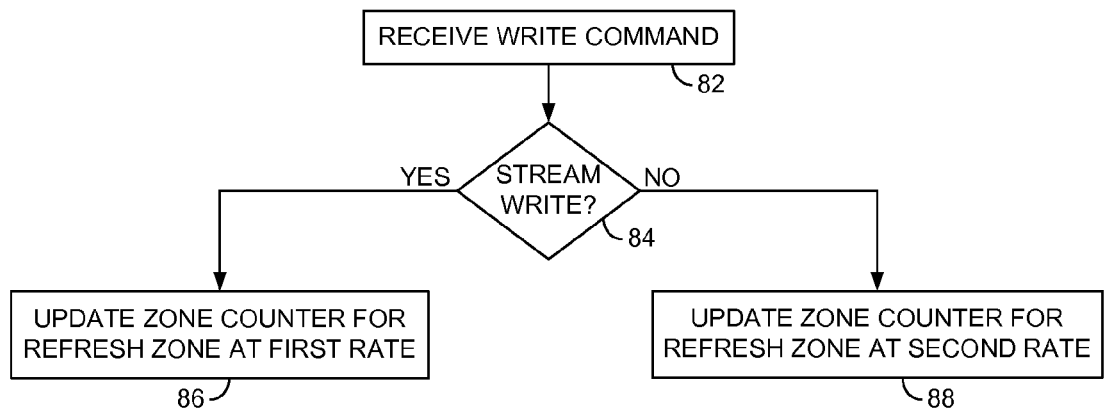
FIG. 5C shows a flow diagram according to an embodiment of the present invention wherein the zone counters are updated at different rates based on whether the write command is a streaming write command or a non-streaming write command.

FIG. 5C shows a flow diagram according to an embodiment of the present invention wherein when a write command is received (step 82), and the write command is a streaming command (step 84), the corresponding zone counter is updated at a first rate (step 86), otherwise the corresponding zone counter is updated at a second rate (step 88). An example of a streaming command is the "write stream DMA" command as compared to the non-streaming command "write DMA" which are part of the Advanced Technology Attachment (ATA) protocol.

FIG. 6A shows example equations for updating the zone counters according to an embodiment of the present invention. A particular zone counter ZCn is updated by adding an offset computed by a usage model function Fn(UM). The usage model function Fn(UM) is a function of the write command type (WCT) scaled by a data lifeguard value (DLGn) and by a temperature coefficient f(Temp). In the embodiment of FIG. 6A, the write command type (WCT) is computed as a summation of different types, including the LBA scaled by coefficient C1, a write block size (WB) scaled by a coefficient C2, a frequency that the zone counter is being updated (Freq) scaled by a coefficient C3, and whether the write command is a streaming command (ST) scaled by a coefficient C4. The data lifeguard value (DLGn) represents the affect of adjacent track interference on magnetic entropy. In the embodiment of FIG. 6A, any suitable coefficients C5-C8 may be employed to compute the DLGn, wherein the coefficients typically decrease as the adjacency of the refresh zones decreases. For example, the coefficient C5 for the written refresh zone is the highest, the coefficient C6 for the adjacent zones is smaller than C5, and so on.

FIGS. 6B and 6C show tables illustrating an example as to how the DLGn value may be computed for the refresh zones that are proximate a target (written) refresh zone (refresh zone 8 in this example). For the written refresh zone (zone 8), the coefficient C5 is used to update the zone counter for refresh zone 8. For the adjacent refresh zones 7 and 9, the coefficient C6 is used to update the zone counters for refresh zones 7 and 9. For refresh zones 10 and 11 (toward the OD), the coefficient C7 is used to update the zone counters for refresh zones 10 and 11. Accordingly, when a write command is executed in refresh zone 8, refresh zones 4 thru 12 are affected by the write operation (via ATI) and therefore the corresponding zone counters are updated in response to the write command using the coefficients as describe above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry operable to:
      define a plurality of refresh zones, wherein each refresh zone corresponds to a plurality of the tracks;
      first write data to a first refresh zone, and update a first zone counter for a second refresh zone at a first rate; and
      second write data to a third refresh zone, and update the first zone counter for the second refresh zone at a second rate different than the first rate.

2. The disk drive as recited in claim 1, wherein the control circuitry is further operable to update a second zone counter of a fourth refresh zone at a third rate in response to the first write.

3. The disk drive as recited in claim 2, wherein the third rate is different than the first rate.

4. The disk drive as recited in claim 2, wherein:
   the second refresh zone is adjacent to the first refresh zone; and
   the fourth refresh zone is not adjacent to the first refresh zone.

5. The disk drive as recited in claim 2, wherein:
   the second refresh zone is located toward an outer diameter of the disk away from the first zone; and
   the fourth refresh zone is located toward an inner diameter of the disk away from the first zone.

6. The disk drive as recited in claim 2, wherein the third rate varies based on an ambient temperature of the disk drive.

7. A disk drive comprising:
   a disk comprising a plurality of tracks;
   a head actuated over the disk; and
   control circuitry operable to:
      define a plurality of refresh zones, wherein each refresh zone corresponds to a plurality of the tracks;
      write data to a first refresh zone in response to a write command; and
      update a first zone counter for the first refresh zone at a first rate based on a type of the write command.

8. The disk drive as recited in claim 7, wherein the type of the write command comprises a logical block address range.

9. The disk drive as recited in claim 8, wherein the write command identifies a first logical block address range and the control circuitry is further operable to:
   write data to a second refresh zone in response to a second write command identifying a second logical block address range; and
   update a second zone counter for the second refresh zone at a second rate different than the first rate.

10. The disk drive as recited in claim 7, wherein the type of the write command comprises a block size of the first write command.

11. The disk drive as recited in claim 7, wherein the type of the write command comprises a write continuous command indicating the first write command will be completed when a write error is encountered.

12. The disk drive as recited in claim 7, wherein the type of the write command comprises one of a non-streaming command and a streaming command.

13. A method of operating a disk drive, the disk drive comprising a disk comprising a plurality of tracks, and a head actuated over the disk, the method comprising:
- defining a plurality of refresh zones, wherein each refresh zone corresponds to a plurality of the tracks;
- first writing data to a first refresh zone, and updating a first zone counter for a second refresh zone at a first rate; and
- second writing data to a third refresh zone, and updating the first zone counter for the second refresh zone at a second rate different than the first rate.

14. The method as recited in claim 13, further comprising updating a second zone counter of a fourth refresh zone at a third rate in response to the first write.

15. The method as recited in claim 14, wherein the third rate is different than the first rate.

16. The method as recited in claim 14, wherein:
- the second refresh zone is adjacent to the first refresh zone; and
- the fourth refresh zone is not adjacent to the first refresh zone.

17. The method as recited in claim 14, wherein:
- the second refresh zone is located toward an outer diameter of the disk away from the first zone; and
- the fourth refresh zone is located toward an inner diameter of the disk away from the first zone.

18. The method as recited in claim 14, wherein the third rate varies based on an ambient temperature of the disk drive.

19. A method of operating a disk drive, the disk drive comprising a disk comprising a plurality of tracks, and a head actuated over the disk, the method comprising:
- defining a plurality of refresh zones, wherein each refresh zone corresponds to a plurality of the tracks;
- writing data to a first refresh zone in response to a write command; and
- updating a first zone counter for the first refresh zone at a first rate based on a type of the write command.

20. The method as recited in claim 19, wherein the type of the write command comprises a logical block address range.

21. The method as recited in claim 20, wherein the write command identifies a first logical block address range, the method further comprising:
- writing data to a second refresh zone in response to a second write command identifying a second logical block address range; and
- updating a second zone counter for the second refresh zone at a second rate different than the first rate.

22. The method as recited in claim 19, wherein the type of the write command comprises a block size of the first write command.

23. The method as recited in claim 19, wherein the type of the write command comprises a write continuous command indicating the first write command will be completed when a write error is encountered.

24. The method as recited in claim 19, wherein the type of the write command comprises one of a non-streaming command and a streaming command.

* * * * *